(12) United States Patent
Lee et al.

(10) Patent No.: US 12,470,163 B2
(45) Date of Patent: Nov. 11, 2025

(54) POWER MODULE

(71) Applicants: Hyundai Motor Company, Seoul (KR); Kia Corporation, Seoul (KR)

(72) Inventors: Hyun Koo Lee, Seoul (KR); Myung Ill You, Gwangju (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 329 days.

(21) Appl. No.: 18/099,434

(22) Filed: Jan. 20, 2023

(65) Prior Publication Data

US 2024/0048082 A1 Feb. 8, 2024

(30) Foreign Application Priority Data

Aug. 3, 2022 (KR) .................. 10-2022-0096894

(51) Int. Cl.
*H02P 27/06* (2006.01)
*H02M 1/08* (2006.01)
*H02M 7/5387* (2007.01)

(52) U.S. Cl.
CPC .............. *H02P 27/06* (2013.01); *H02M 1/08* (2013.01); *H02M 7/53871* (2013.01)

(58) Field of Classification Search
CPC ...... H02P 27/06; H02M 1/08; H02M 7/53871
See application file for complete search history.

(56) References Cited

U.S. PATENT DOCUMENTS

2009/0293760 A1 12/2009 Kumar et al.
2020/0021205 A1* 1/2020 Nabeshi .................. B60R 16/03
2020/0366232 A1* 11/2020 Kinjo ...................... H02P 25/18

FOREIGN PATENT DOCUMENTS

| JP | 2005-328675 A | 11/2005 |
| JP | 2010-193713 A | 9/2010 |
| JP | 2020-048361 A | 3/2020 |
| JP | 2021-176199 A | 11/2021 |
| KR | 10-2013-0078106 A | 7/2013 |
| KR | 10-1834487 B1 | 3/2018 |
| KR | 10-2018-0059592 A | 6/2018 |
| KR | 10-2111092 B1 | 5/2020 |
| KR | 10-2023-0169643 A | 12/2023 |

* cited by examiner

*Primary Examiner* — Zoheb S Imtiaz
(74) *Attorney, Agent, or Firm* — Morgan, Lewis & Bockius LLP

(57) ABSTRACT

A power module may include: a positive terminal connected to a positive pole of a battery; a negative terminal connected to a negative pole of the battery; an output terminal connected to a winding among multiple windings included in a motor; a changeover terminal connected to a neutral point regarding the multiple windings; a top switch connected between the positive terminal and the output terminal; a bottom switch connected between the negative terminal and the output terminal; and a changeover switch connected to the changeover terminal and configured to form a common node with at least one of the top switch or the bottom switch.

14 Claims, 13 Drawing Sheets

POWER MODULE

CROSS-REFERENCE TO RELATED APPLICATION

This application is based on and claims priority under 35 U.S.C. 119 to Korean Patent Application No. 10-2022-0096894, filed on Aug. 3, 2022, in the Korean Intellectual Property Office, the disclosure of which is herein incorporated by reference in its entirety.

TECHNICAL FIELD

The present disclosure relates to an inverter power module integrated with a switch which is switched according to a motor driving mode.

BACKGROUND

In general, windings of respective phases included in a motor have first ends connected to a single inverter and have second ends connected to each other, thereby forming a Y-connection.

When the motor is driven, a switch inside the inverter is turned on/off by pulse width modulation control and applies a line voltage to the Y-connected motor windings such that, by generating an AC current, a torque is generated.

An eco-friendly vehicle (for example, electric car) powered by such a torque from a motor has fuel efficiency (or electric efficiency) determined by inverter-motor power conversion efficiency, and it is important to maximize the inverter power conversion efficiency and the motor efficiency in order to improve the fuel efficiency.

The efficiency of the inverter-motor system is mainly determined by the voltage usage ratio of the inverter, and the vehicle fuel efficiency may be improved when a vehicle driving point determined by the relation between the motor speed and torque is formed in a range having a high voltage usage ratio.

However, if the motor winding number is increased to increase the motor maximum torque, the range having a high voltage usage ratio becomes far from the low-torque area, which is a major vehicle driving point. This may degrade the fuel efficiency. In addition, if a major driving point is designed to be included in the range having a high voltage usage ratio from the viewpoint of fuel efficiency, the maximum motor torque may be limited, thereby degrading the accelerating/starting performance of the vehicle.

In the pertinent technical field, there is a need for a motor driving technology capable of improving the system efficiency while covering both low-output and high-output ranges with a single motor. As a result, a technology for driving a single motor in two different modes by using two inserters and a mode-switching switch has been introduced.

The above descriptions regarding background technologies have been made only to help understanding of the background of the present disclosure, and are not to be deemed by those skilled in the art to correspond to already-known prior arts.

SUMMARY

Accordingly, a technical problem to be solved by the present disclosure is to provide an inverter power module integrated with a switch which is switched according to a motor driving mode.

In order to solve the above-mentioned technical problem, a power module according to an embodiment of the present disclosure may include: a positive terminal connected to a positive pole of a battery; a negative terminal connected to a negative pole of the battery; an output terminal connected to a winding among multiple windings included in a motor; a changeover terminal connected to a neutral point regarding the multiple windings; a top switch connected between the positive terminal and the output terminal; a bottom switch connected between the negative terminal and the output terminal; and a changeover switch connected to the changeover terminal and configured to form a common node with at least one of the top switch or the bottom switch.

The present disclosure is advantageous in that an inverter power module is integrated with a switch which is switched according to a motor driving mode such that no separate module is necessary in connection with the switch which is switched according to a motor driving mode, thereby reducing the area and cost required for a motor driving apparatus.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

In the description of the following embodiments, the word "predetermined" as used herein means that a value for a parameter is determined when the parameter is used in a process or algorithm. For some embodiments, the value for the parameter is determined before the process or algorithm begins or while the process or algorithm is performed.

Terms such as "first" and "second" used to distinguish various elements are not limited by the elements. For example, a first component may be referred to as a second component, and conversely, a second component may be referred to as a first component.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Hereinafter, the present disclosure will be described in more detail through examples. These examples are only for illustrating the present disclosure, and the scope of protection of the rights of the present disclosure is not limited by these examples.

Figure 1:
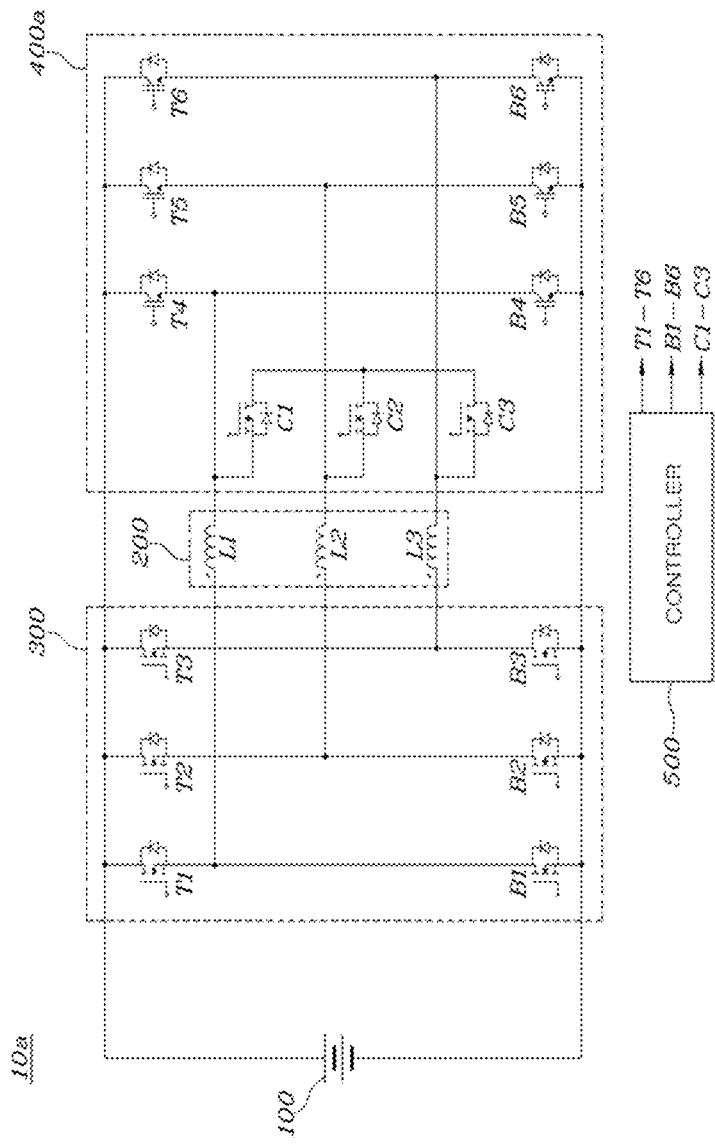
FIG. 1 is a circuit diagram illustrating a motor driving apparatus according to an embodiment of the present disclosure.

FIG. 1 is a circuit diagram illustrating a motor driving apparatus according to an embodiment of the present disclosure.

As illustrated in FIG. 1, the motor driving apparatus 10a may include a battery 100, a motor 200, a first inverter 300, a second inverter 400a, and a controller 500. The controller 500 according to an exemplary embodiment of the present disclosure may be a hardware device implemented by various electronic circuits (e.g., computer, microprocessor, CPU, ASIC, circuitry, logic circuits, etc.). The processor may be implemented by a non-transitory memory storing, e.g., a program(s), software instructions reproducing algorithms, etc., which, when executed, performs various functions described hereinafter, and a processor configured to execute the program(s), software instructions reproducing algorithms, etc. Herein, the memory and the processor may be implemented as separate semiconductor circuits. Alternatively, the memory and the processor may be implemented as a single integrated semiconductor circuit. The processor may embody one or more processor(s).

The motor 200 may have a plurality of windings L1, L2, and L3 corresponding to each of a plurality of phases.

Figure 4:
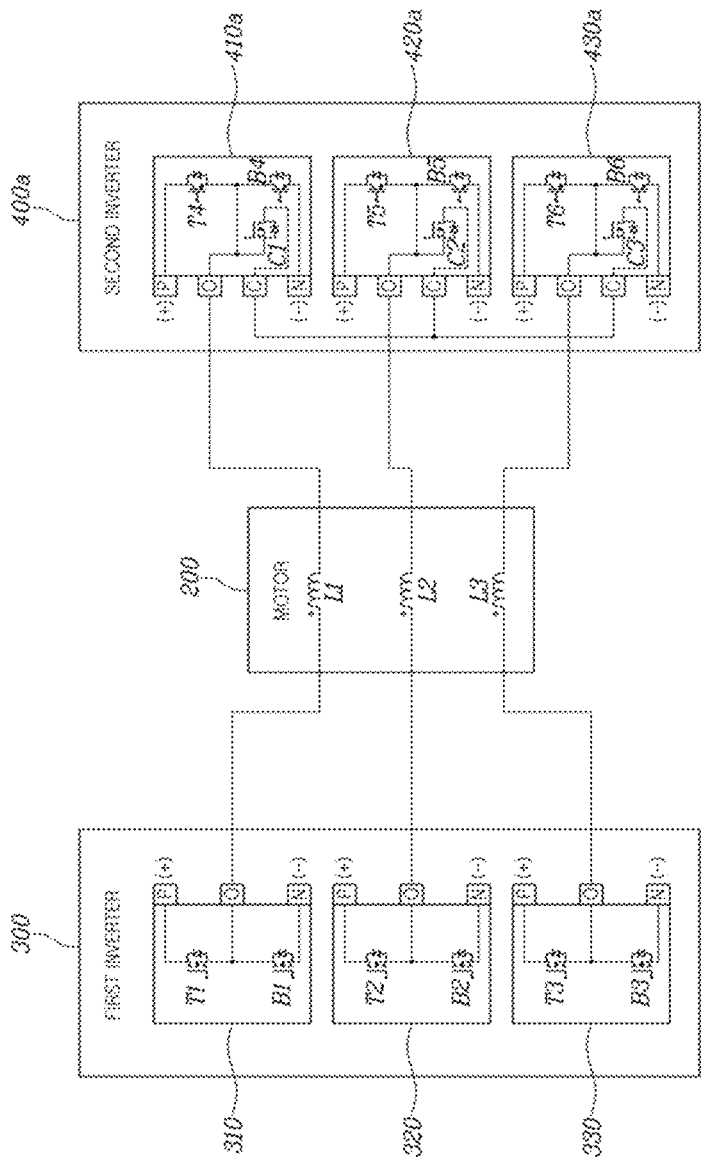
FIG. 4 is a diagram illustrating a configuration of a power module included in an inverter illustrated in FIG. 1 according to an embodiment.

The first inverter 300 may be implemented as at least one first power module 310, 320, and 330 in FIG. 4 including first top switches T1 to T3 and first bottom switches B1 to B3.

The first inverter 300 may convert a DC voltage of the battery 100 into an AC voltage having a plurality of phases as the first top switches T1 to T3 and the first bottom switches B1 to B3 are switched. In addition, the first inverter 300 may drive the motor 200 by providing an AC voltage corresponding to each of the plurality of phases to one end of the plurality of windings L1, L2, and L3. The first top switches T1 to T3 and the first bottom switches B1 to B3 may be implemented as metal oxide semiconductor field effect transistors (MOSFETs).

The second inverter 400a may be implemented as a plurality of second power modules 410a, 420a, and 430a of FIG. 4 including second top switches T4 to T6, second bottom switches B4 to B6, and changeover switches C1 to C3.

Based on whether the changeover switches C1 to C3 are turned on, as the second top switches T4 to T6 and the second bottom switches B4 to B6 are switched, the second inverter 400a may convert a DC voltage of the battery 100 into an AC voltage having a plurality of phases. In the present embodiment, when the changeover switches C1 to C3 are turned off, as the second top switches T4 to T6 and the second bottom switches B4 to B6 are switched, the second inverter 400a may convert the DC voltage of the battery 100 into an AC voltage having a plurality of phases. In addition, the second inverter 400a may drive the motor 200 by providing the AC voltage corresponding to each of the plurality of phases to the other end of the plurality of windings L1, L2, and L3.

The second top switches T4 to T6 and the second bottom switches B4 to B6 may be implemented as transistors having the same voltage/current capacity and material. In the present embodiment, the second top switches T4 to T6 and the second bottom switches B4 to B6 are implemented as insulated gate bipolar transistors (IGBTs), but according to the embodiment, the second top switches T4 to T6 and the second bottom switches B4 to B6 may be implemented as metal oxide semiconductor field effect transistors (MOSFETs).

Each of the changeover switches C1 to C3 may be equally implemented as any one of MOSFETs and IGBTs.

A detailed description of the configuration and operation method of the power module implementing the first inverter 300 and the second inverter 400a will be described later with reference to FIG. 4.

The controller 500 may control the first inverter 300 and the second inverter 400a to drive the motor by switching the first top switches T1 to T3, the first bottom switches B1 to B3, the second top switches T4 to T6, and the second bottom switches B4 to B6.

In addition, the controller 500 may control whether the changeover switches C1 to C3 provided in the second inverter 400a are turned on according to a motor driving mode. The motor driving mode may include a closed-end winding mode (CEW) and an open-end winding mode (OEW). The CEW refers to a mode in which the other end of the plurality of windings L1, L2, and L3 included in the motor 200 form a neutral point, thereby efficiently driving the motor through only the first inverter 300. Conversely, the OEW refers to a mode in which the other end of the plurality of windings L1, L2, and L3 included in the motor 200 does not form the neutral point, thereby increasing the driving force of the motor through not only the first inverter 300 but also the second inverter 400a.

Figure 2:
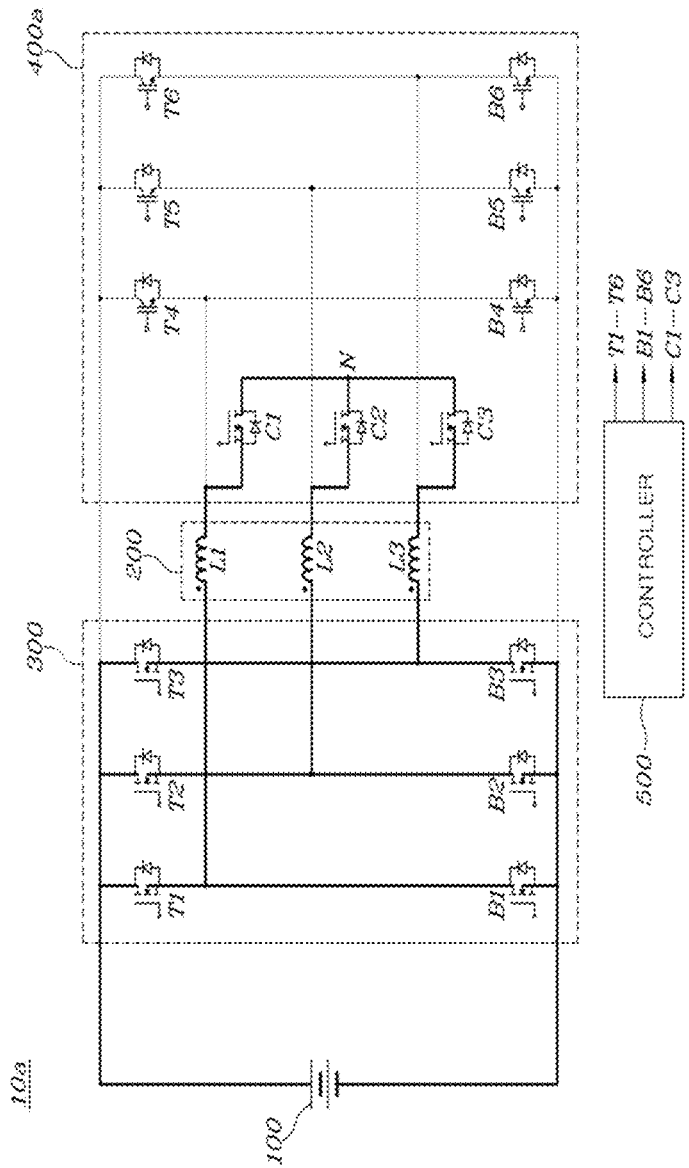
FIG. 2 is a diagram illustrating a closed-end winding mode performed in the motor driving apparatus illustrated in FIG. 1.

FIG. 2 is a diagram illustrating a closed-end winding mode (CEW) performed in the motor driving apparatus 10a illustrated in FIG. 1.

As illustrated in FIG. 2, when the motor driving mode is set to the CEW, the controller 500 may turn on the changeover switches C1 to C3 so that the other end of the plurality of windings L1 to L3 form a neutral point (N).

In addition, the controller 500 may control the first inverter 300 to provide an AC voltage corresponding to a plurality of phases to one end of the plurality of windings L1, L2, and L3 by complementarily switching the first top switches T1 to T3 and the first bottom switches B1 to B3.

Figure 3:
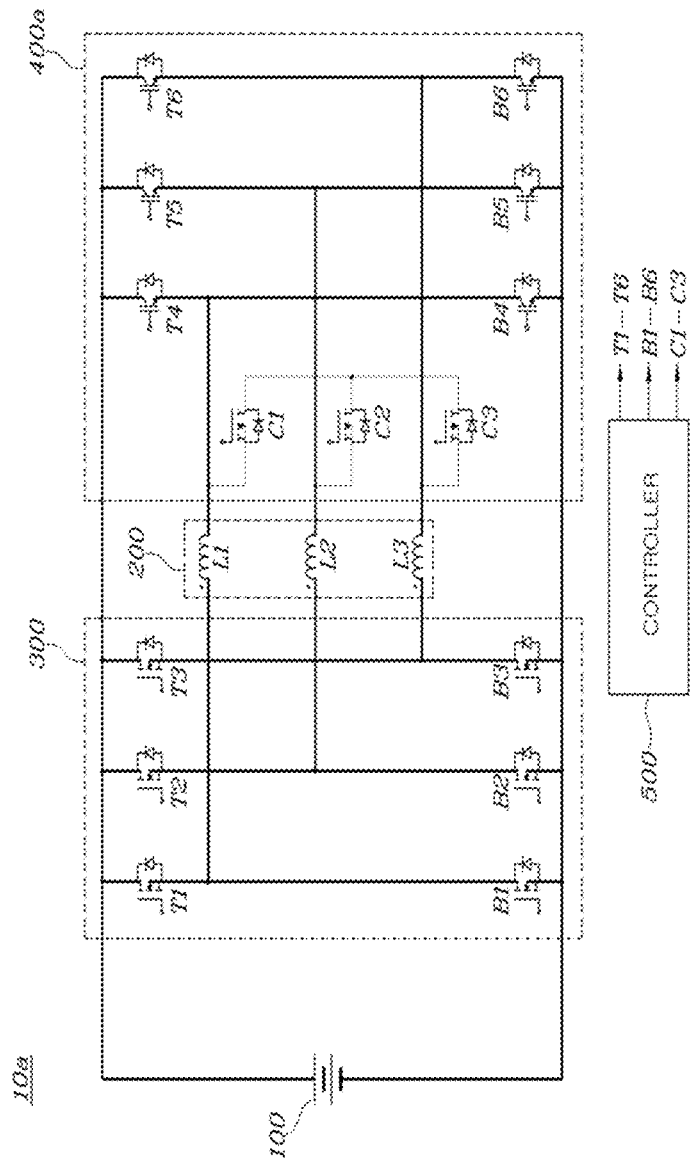
FIG. 3 is a diagram illustrating an open-end winding mode performed in the motor driving apparatus illustrated in FIG. 1.

FIG. 3 is a diagram illustrating an open-end winding mode (OEW) performed in the motor driving apparatus 10a illustrated in FIG. 1.

As illustrated in FIG. 3, when a motor driving mode is set to the OEW, the controller 500 may turn off the changeover switches C1 to C3 so that the other end of the plurality of windings L1 to L3 does not form the neutral point.

In addition, the controller 500 may control the first inverter 300 and the second inverter 400a to provide the AC voltage corresponding to the plurality of phases to one end or the other end of the plurality of windings L1, L2, and L3 by complementarily switching the second top switches T4 to T6 and the second bottom switches B4 to B6 as well as the first top switches T1 to T3 and the first bottom switches B1 to B3.

FIG. 4 is a diagram illustrating a configuration of a power module included in the first inverter 300 and the second inverter 400a illustrated in FIG. 1 according to an embodiment. As illustrated in FIG. 4, the first inverter 300 may include a plurality of first power modules 310, 320, and 330, and the second inverter 400a may include a plurality of second power modules 410a, 420a, and 430a. The configuration and operation method of each of the plurality of first power modules 310, 320, and 330 are implemented in the same manner, and the configuration and operation method of each of the plurality of second power modules 410a, 420a, and 430a are implemented in the same manner. The first inverter 300 and the second inverter 400a may be respectively arranged on one side surface of a link capacitor (not illustrated) used in the inverter and the other side surface thereof opposite the one side.

Each of the plurality of first power modules 310, 320, 330 may include first top switches T1 to T3, first bottom switches B1 to B3, a positive terminal P connected to the positive terminal (+) of the battery 100 of FIG. 1, a negative terminal N connected to the negative terminal (−) of the battery 100, and an output terminal O connected to one end of any one of the plurality of windings L1 to L3. Each of the first top switches T1, T2, and T3 may be connected between the positive terminal P and the output terminal O, each of the first bottom switches B1, B2, and B3 may be connected between the negative terminal N and the output terminal O.

Each of the plurality of second power modules 410a, 420a, and 430a may include second top switches T4 to T6, second bottom switches B4 to B6, and changeover switches C1 to C3, and may have a positive terminal P connected to the positive terminal (+) of the battery 100, a negative terminal N connected to the negative terminal (−) of the battery 100, an output terminal O connected to the other end of any one of the plurality of windings L1 to L3, and a changeover terminal C connected to one end of the changeover switches C1 to C3.

Each of the second top switches T4 to T6 may be connected between the positive terminal P and the output terminal O. More specifically, drain terminals (collector terminals) of the second top switches T4 to T6 may be respectively connected to the positive terminal P, and source terminals (emitter terminals) of the second top switches T4 to T6 may be respectively connected to the output terminal O.

Each of the second bottom switches B4 to B6 may be connected between the negative terminal N and the output terminal O. More specifically, the drain terminals (collector terminals) of the second bottom switches B4 to B6 may be respectively connected to the output terminals O, and the source terminals (emitter terminals) of the second bottom switches B4 to B6 may be respectively connected to the negative terminal (N).

In the present embodiment, the source terminals (emitter terminals) of the changeover switches C1 to C3 may be respectively connected to the output terminal O and located at the common node as the source terminals (emitter terminals) of the second top switches T4 to T6 and drain terminals (collector terminals) of the second bottom switches B4 to B6. The drain terminals (collector terminals) of the changeover switches C1 to C3 may be respectively connected to the changeover terminal C. The changeover terminal C may be short-circuited to each other so that the other ends of the plurality of windings L1, L2, and L3 included in the motor form a neutral point. As the changeover switches C1 to C3 that are switched according to the motor driving mode are integrated into each of the plurality of second power modules 410a, 420a, 430a, there is no need to separately provide a module for the changeover switches C1 to C3, thereby reducing the area and cost consumed in the motor driving apparatus 10a in FIG. 1.

Meanwhile, a switch element according to the present embodiment may receive a current input through a drain terminal (collector terminal) and may output the input current through a source terminal (emitter terminal). In addition, when the switch element is implemented as a metal oxide semiconductor field effect transistor (MOSFET), both ends of the switch element may be referred to as a drain terminal and a source terminal, respectively, and when the switch element is implemented as an insulated gate bipolar transistor (IGBT), both ends of the switch element may be referred to as a collector terminal and an emitter terminal, respectively.

Since the configurations of the second power modules 410a, 420a, and 430a are all implemented in the same manner, only the configuration of the second power module 410a will be described below with reference to FIG. 5.

Figure 5:
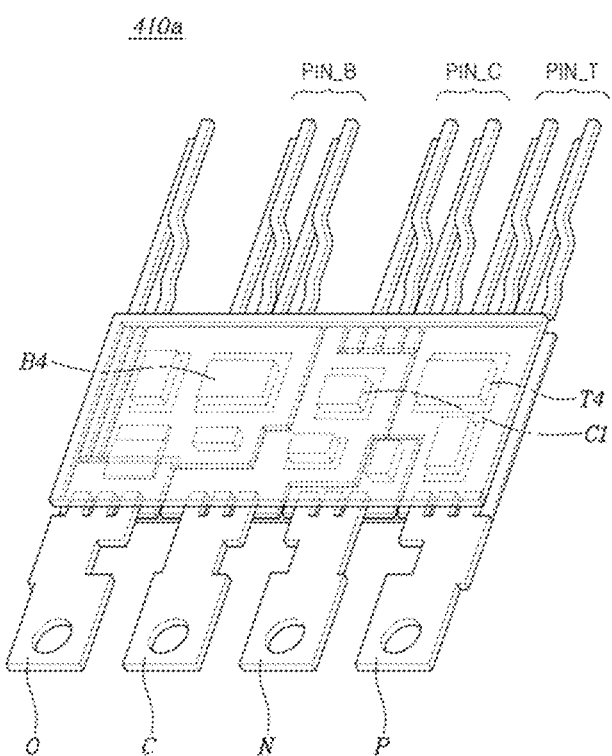
FIG. 5 is a diagram illustrating a configuration of a second power module illustrated in FIG. 4 according to an embodiment.

FIG. 5 is a diagram illustrating a configuration of the second power module 410a illustrated in FIG. 4 according to an embodiment. As illustrated in FIG. 5, the second power module 410a may include the second top switch T4, the second bottom switch B4, and the changeover switch C1.

An output terminal O, a changeover terminal C, a negative terminal N, and a positive terminal P may be arranged on one side of the second power module 410a, and control pins PIN_B, PIN_C, and PIN_T may be arranged on the other side opposite the one side of the second power module 410a. The second power module 410a may receive a signal for controlling a turn-on state or the like of the second top switch T4, the changeover switch C1, and the second bottom switch B4 through each of the control pin PIN_B, the control pin PIN_C, and the control pin PIN_T. At this time, the control pin PIN_C for controlling the turn-on state of the changeover switch C1 and the control pin PIN_T for controlling the turn-on state of the second top switch T4 may be arranged adjacent to each other because they do not need to have an insulating distance therebetween, thereby reducing the area of the second power module 410a.

Figure 6:
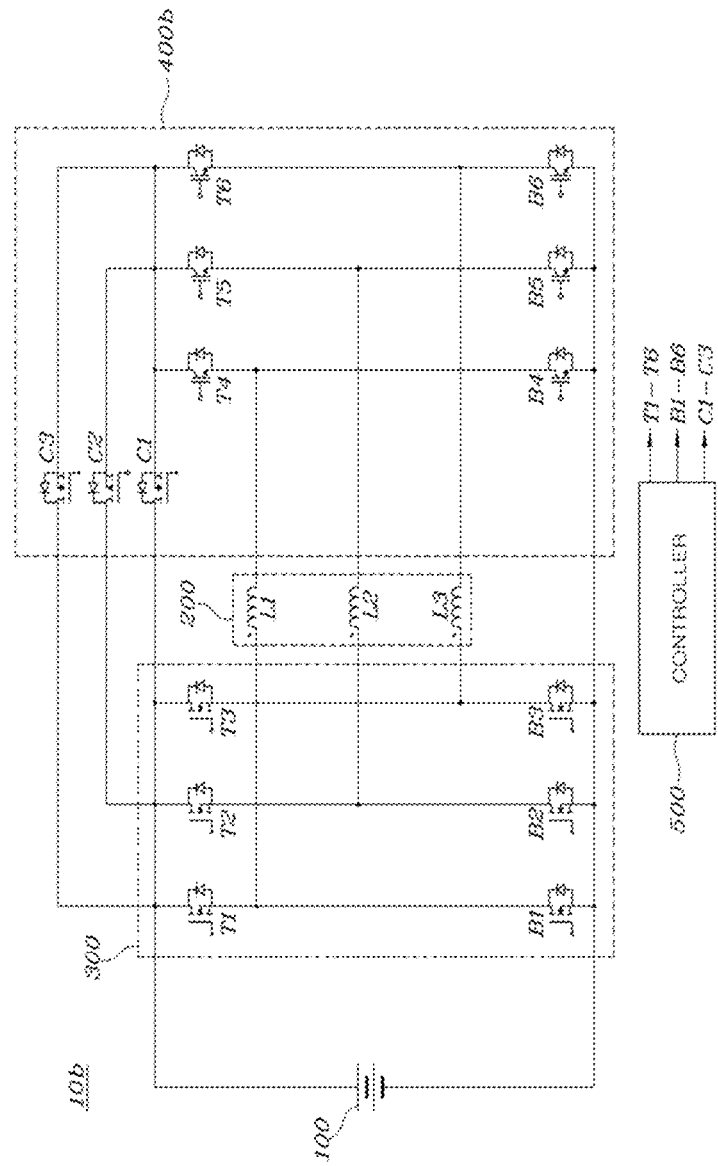
FIG. 6 is a circuit diagram illustrating a motor driving apparatus according to another embodiment of the present disclosure.

FIG. 6 is a circuit diagram illustrating a motor driving apparatus 10b according to another embodiment of the present disclosure. As illustrated in FIG. 6, the motor driving apparatus 10b may include a battery 100, a motor 200, a first inverter 300, a second inverter 400b, and a controller 500.

Figure 8:
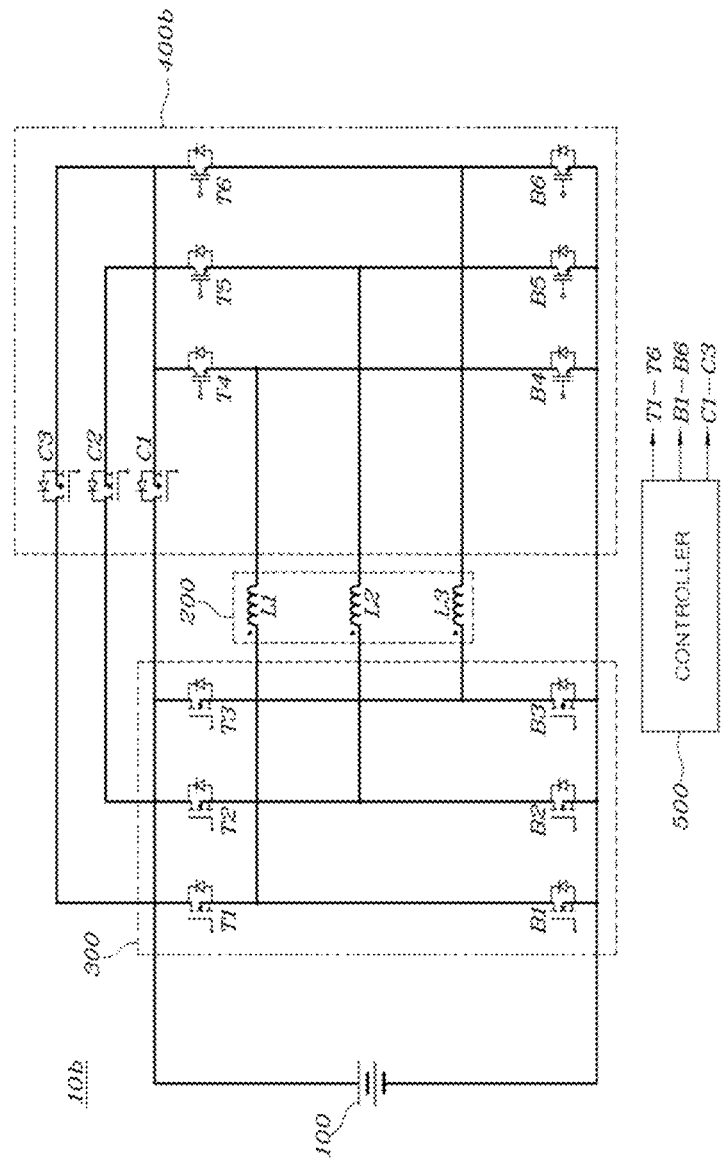
FIG. 8 is a diagram illustrating an open-end winding mode performed in the motor driving apparatus illustrated in FIG. 6.

The second inverter 400b may be implemented as a plurality of second power modules 410b, 420b, and 430b of FIG. 8 including second top switches T4 to T6, second bottom switches B4 to B6, and changeover switches C1 to C3.

In the present embodiment, when the changeover switches C1 to C3 are turned on, as the second top switches T4 to T6 and the second bottom switches B4 to B6 are switched, the second inverter 400b may convert a DC voltage of the battery 100 into an AC voltage having a plurality of phases. In addition, the second inverter 400b may drive the motor 200 by providing the AC voltage corresponding to each of the plurality of phases to the other end of the plurality of windings L1, L2, and L3.

A detailed description of the configuration and operation method of the power module implementing the first inverter 300 and the second inverter 400b will be described later with reference to FIG. 9.

Figure 7:
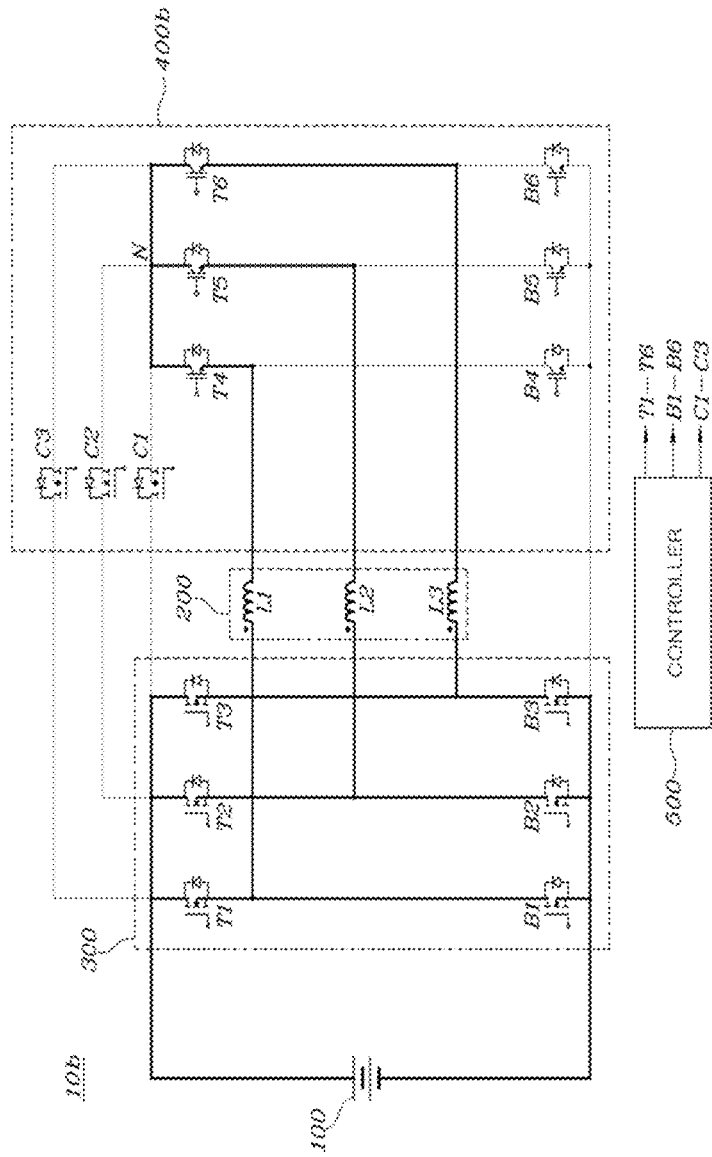
FIG. 7 is a diagram illustrating a closed-end winding mode performed in the motor driving apparatus illustrated in FIG. 6.

FIG. 7 is a diagram illustrating a closed-end winding mode (CEW) performed in the motor driving apparatus 10b illustrated in FIG. 6.

As illustrated in FIG. 7, when the motor driving mode is set to the CEW, the controller 500 may turn off the changeover switches C1 to C3 and the second bottom switches B4 to B6 and turn on the second top switch T4 to T6, so that the other end of the plurality of windings L1 to L3 form a neutral point N.

In addition, the controller 500 may control the first inverter 300 to provide the AC voltage corresponding to the plurality of phases to one end of the plurality of windings L1, L2, and L3 by complementarily switching the first top switches T1 to T3 and the first bottom switches B1 to B3.

FIG. 8 is a diagram illustrating an open-end winding mode (OEW) performed in the motor driving apparatus 10b illustrated in FIG. 6.

As illustrated in FIG. 8, when the motor driving mode is set to the OEW, the controller 500 may turn on the changeover switches C1 to C3 so that the other end of the plurality of windings L1 to L3 does not form the neutral point.

In addition, the controller 500 may control the first inverter 300 and the second inverter 400b to provide the AC voltage corresponding to the plurality of phases to one end or the other end of the plurality of windings L1, L2, and L3 by complementarily switching the second top switches T4 to T6 and the second bottom switches B4 to B6 as well as the first top switches T1 to T3 and the first bottom switches B1 to B3.

Figure 9:
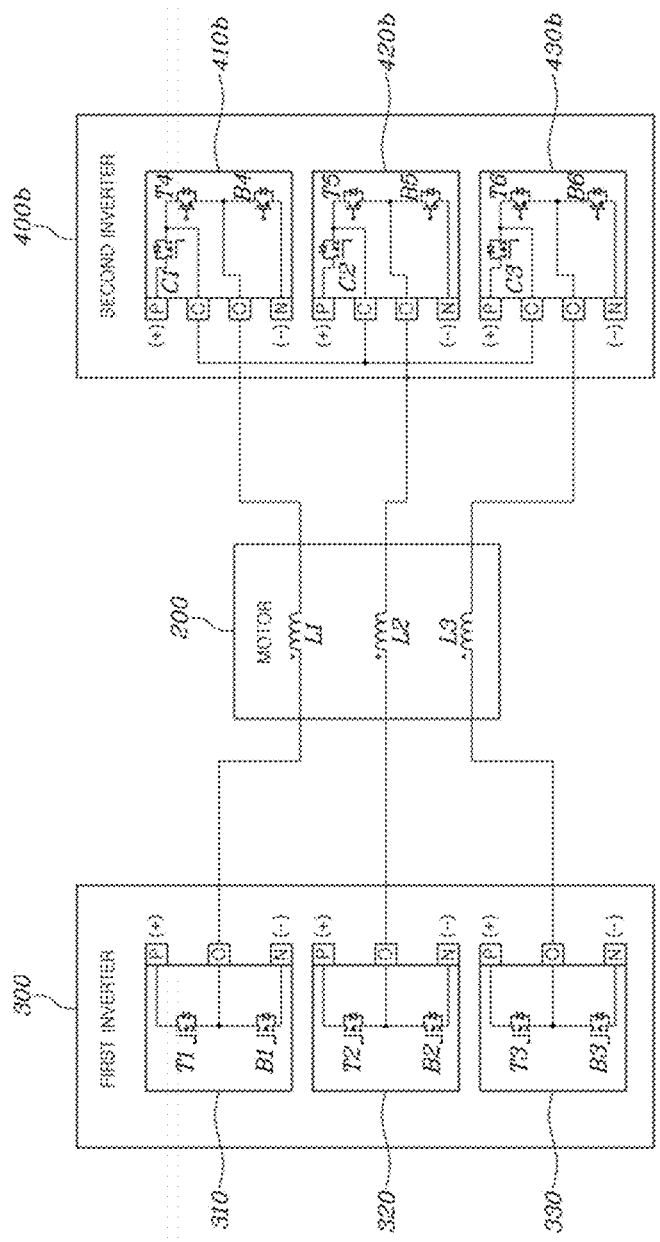
FIG. 9 is a diagram illustrating a configuration of a power module included in an inverter illustrated in FIG. 6 according to an embodiment.

FIG. 9 is a diagram illustrating a configuration of the power module included in the first inverter 300 and the second inverter 400b illustrated in FIG. 6 according to an embodiment.

Since the configuration and operation method of the first inverter 300 illustrated in FIG. 9 are implemented in the same manner as the first inverter 300 illustrated in FIG. 4, a detailed description thereof will be omitted.

The second inverter 400b may include a plurality of second power modules 410b, 420b, and 430b.

Each of the plurality of second power modules 410b, 420b, and 430b may include second top switches T4 to T6, second bottom switches B4 to B6, changeover switches C1 to C3, a positive terminal P connected to the positive terminal (+) of the battery 100 of FIG. 6, a negative terminal N connected to the negative terminal (−) of the battery 100, an output terminal O connected to the other end of any one of the plurality of windings L1 to L3, and a changeover terminal C connected to one end of the changeover switches C1 to C3.

In the present embodiment, each of the changeover switches C1 to C3 may be connected between the second top switches T4 to T6 and the positive terminal P while each of the second top switches T4 to T6 is connected between the positive terminal P and the output terminal O. More specifically, drain terminals (collector terminals) of the changeover switches C1 to C3 may be respectively connected to the positive terminal P, and source terminals (emitter terminals) of the changeover switches C1 to C3 may be respectively connected to the changeover terminal C. The drain terminals (collector terminals) of the second top switches T4 to T6 may be located at the common node as the source terminals (emitter terminals) of the changeover switches C1 to C3, and the source terminals (emitter terminals) of the second top switches T4 to T6 may be connected to the output terminal O.

Each of the second bottom switches B4 to B6 may be connected between the negative terminal N and the output terminal O. More specifically, the drain terminals (collector terminals) of the second bottom switches B4 to B6 may be respectively connected to the output terminal O, and the source terminals (emitter terminals) of the second bottom switches B4 to B6 may be connected to the negative terminal N.

The changeover terminal C of each of the plurality of second power modules 410b, 420b, and 430b may be short-circuited to each other so that the other ends of the plurality of windings L1, L2, and L3 included in the motor form a neutral point. As the changeover switches C1 to C3 that are switched according to the motor driving mode are integrated into each of the plurality of second power modules 410b, 420b, and 430b, there is no need to separately provide a module for the changeover switches C1 to C3, thereby reducing the area and cost consumed in the motor driving apparatus 10b in FIG. 6.

Figure 10:
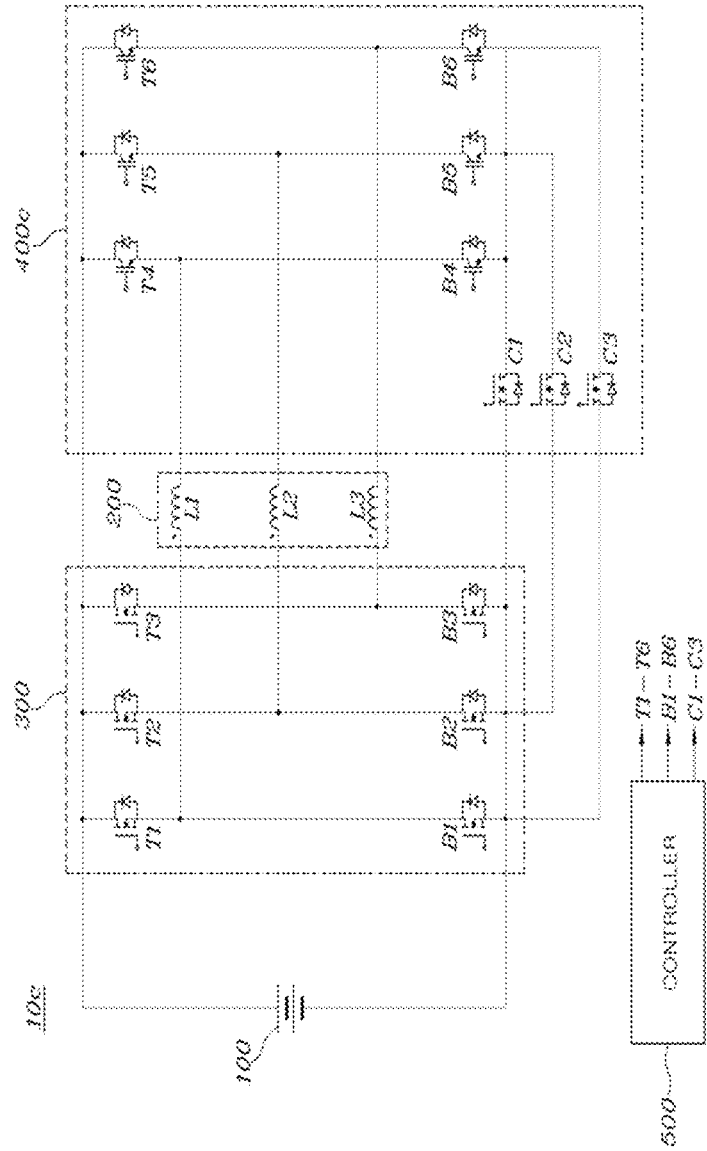
FIG. 10 is a circuit diagram illustrating a motor driving apparatus according to still another embodiment of the present disclosure.

FIG. 10 is a circuit diagram illustrating a motor driving apparatus 10c according to still another embodiment of the present disclosure. As illustrated in FIG. 10, the motor driving device 10c may include a battery 100, a motor 200, a first inverter 300, a second inverter 400c, and a controller 500.

The second inverter 400c may be implemented as a plurality of second power modules (410c, 420c, and 430c of FIG. 13) including second top switches T4 to T6, second bottom switches B4 to B6, and changeover switches C1 to C3.

In this embodiment, similarly to the second inverter 400b illustrated in FIG. 6, when the changeover switches C1 to C3 are turned on, as the second top switches T4 to T6 and the second bottom switches B4 to B6 are switched, the second inverter 400c may convert a DC voltage of the battery 100 into an AC voltage having a plurality of phases. In addition, the second inverter 400b may drive the motor 200 by providing the AC voltage corresponding to each of the plurality of phases to the other end of the plurality of windings L1, L2, and L3.

A detailed description of the configuration and operation method of the power module implementing the first inverter 300 and the second inverter 400c will be described later with reference to FIG. 13.

Figure 11:
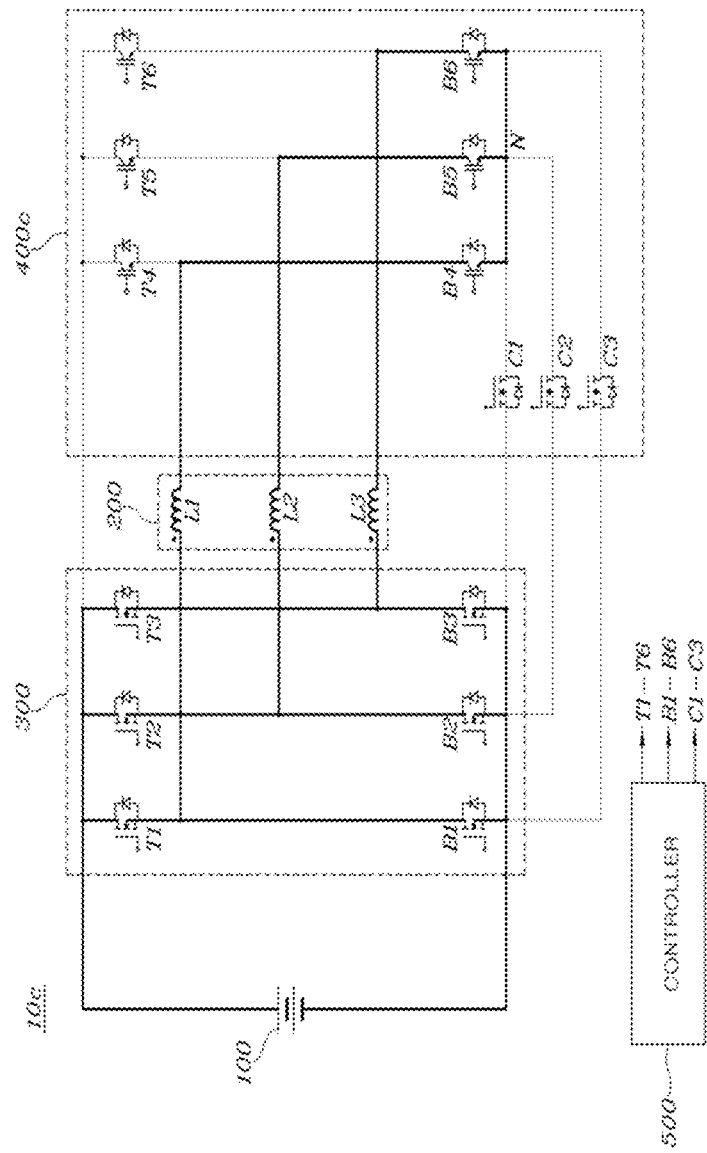
FIG. 11 is a diagram illustrating a closed-end winding mode performed in the motor driving apparatus illustrated in FIG. 10.

FIG. 11 is a diagram illustrating a closed-end winding mode (CEW) performed in the motor driving apparatus 10c illustrated in FIG. 10.

As illustrated in FIG. 11, when the motor driving mode is set to the CEW, the controller 500 may turn off the changeover switches C1 to C3 and the second top switches T4 to T6 and turn on the second bottom switches B4 to B6, so that the other end of the plurality of windings L1 to L3 form a neutral point N.

In addition, the controller 500 may control the first inverter 300 to provide the AC voltage corresponding to the plurality of phases to one end of the plurality of windings L1, L2, and L3 by complementarily switching the first top switches T1 to T3 and the first bottom switches B1 to B3.

Figure 12:
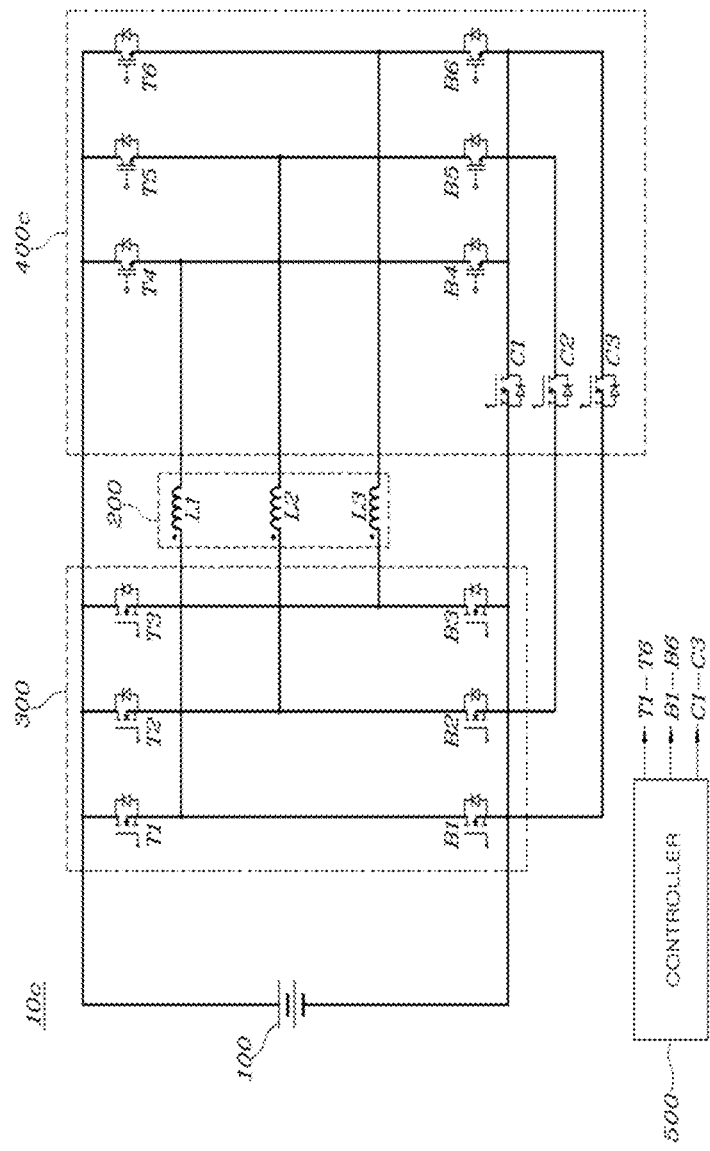
FIG. 12 is a diagram illustrating an open-end winding mode performed in the motor driving apparatus illustrated in FIG. 10.

FIG. 12 is a diagram illustrating an open-end winding mode (OEW) performed in the motor driving apparatus 10c illustrated in FIG.

As illustrated in FIG. 12, when the motor driving mode is set to the OEW, the controller 500 may turn on the changeover switches C1 to C3, so that the other end of the plurality of windings L1 to L3 does not form the neutral point.

In addition, the controller 500 may control the first inverter 300 and the second inverter 400c to provide the AC voltage corresponding to the plurality of phases to one end and the other end of the plurality of windings L1, L2, and L3 by complementarily switching the second top switches T4 to T6 and the second bottom switches B4 to B6 as well as the first top switches T1 to T3 and the first bottom switches B1 to B3.

Figure 13:
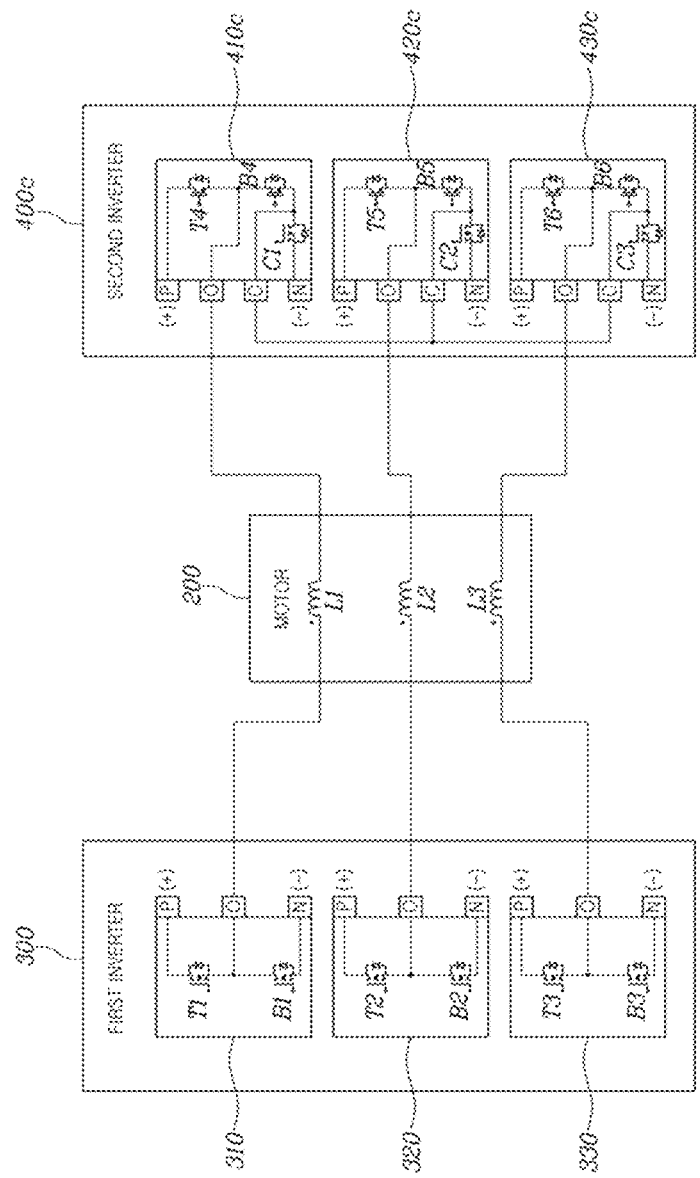
FIG. 13 is a diagram illustrating a configuration of a power module included in an inverter illustrated in FIG. 10 according to an embodiment.

FIG. 13 is a diagram illustrating configurations of the inverters illustrated in FIG. 10 according to an embodiment.

The configuration and operation method of the first inverter 300 illustrated in FIG. 13 are implemented in the same manner as the first inverter 300 illustrated in FIG. 5.

The second inverter 400c may include a plurality of second power modules 410c, 420c, and 430c.

Each of the plurality of second power modules 410c, 420c, and 430c may include second top switches T4 to T6, second bottom switches B4 to B6, changeover switches C1 to C3, a positive terminal P connected to the positive terminal (+) of the battery 100 of FIG. 10, a negative terminal N connected to the negative terminal (−) of the battery 100, an output terminal O connected to the other end of any one of the plurality of windings L1 to L3, and a changeover terminal C connected to one end of the changeover switches C1 to C3.

In this embodiment, each of the changeover switches C1 to C3 may be connected between the second bottom switches B4 to B6 and the negative terminal N while each of the second bottom switches B4 to B6 is connected between the negative terminal N and the output terminal O. More specifically, source terminals (emitter terminals) of the changeover switches C1 to C3 may be respectively connected to the negative terminal N, and drain terminals (collector terminals) of the changeover switches C1 to C3 may be respectively connected to the changeover terminal C. The source terminals (emitter terminals) of the second bottom switches B4 to B6 may be located at the common node as the drain terminals (collector terminals) of the changeover switches C1 to C3, and the drain terminals (collector terminals) of the second bottom switches B4 to B6 may be connected to the output terminal O.

Each of the second top switches T4 to T6 may be connected between the positive terminal P and the output terminal O. More specifically, the drain terminals (collector terminals) of the second top switches T4 to T6 may be respectively connected to the positive terminal P, and the source terminals (emitter terminals) of the second top switches T4 to T6 may be respectively connected to the output terminal O.

The respective changeover terminals C of the plurality of second power modules 410c, 420c, and 430c may be short-circuited to each other so that the other ends of the plurality of windings L1, L2, and L3 included in the motor form a neutral point. As the changeover switches C1 to C3 that are switched according to the motor driving mode are integrated into each of the plurality of second power modules 410c, 420c, 430c, there is no need to separately provide a module for the changeover switches C1 to C3, thereby reducing the area and cost consumed in the motor driving apparatus 10c in FIG. 10.

What is claimed is:

1. A power module comprising:
   a positive terminal connected to a positive pole of a battery;
   a negative terminal connected to a negative pole of the battery;
   an output terminal connected to a winding among multiple windings included in a motor;
   a changeover terminal connected to a neutral point regarding the multiple windings;
   a top switch connected between the positive terminal and the output terminal;
   a bottom switch connected between the negative terminal and the output terminal; and
   a changeover switch connected to the changeover terminal and configured to form a common node with the top switch and the bottom switch.

2. The power module of claim 1, wherein the power module is provided in an inverter configured to control driving of the motor according to a motor driving mode, and a turn-on state of the changeover switch is controlled according to the motor driving mode.

3. The power module of claim 2, wherein the turn-on state of the changeover switch is controlled such that the neutral point is formed when the motor driving mode is set to a closed-end winding mode, and the turn-on state of the changeover switch is controlled such that the neutral point is not formed when the motor driving mode is set to an open-end winding mode.

4. The power module of claim 1, wherein the top switch and the bottom switch are complementarily switched when the motor is driven.

5. The power module of claim 1, wherein the top switch and the bottom switch are identically implemented as one of a metal oxide semiconductor field effect transistor (MOSFET) and an insulated gate bipolar transistor (IGBT).

6. The power module of claim 1, wherein the top switch has a current input terminal connected to the positive terminal, and the top switch has a current output terminal connected to the output terminal.

7. The power module of claim 1, wherein the bottom switch has a current input terminal connected to the output terminal, and the bottom switch has a current output terminal connected to the negative terminal.

8. The power module of claim 1, further comprising:
   a first control pin to which a signal for controlling a turn-on state of the top switch is input;
   a second control pin to which a signal for controlling a turn-on state of the bottom switch is input; and
   a third control pin to which a signal for controlling a turn-on state of the changeover switch is input.

9. The power module of claim 1, wherein the changeover switch has a current output terminal configured to form the common node with a current output terminal of the top switch and a current input terminal of the bottom switch, and the changeover switch has a current input terminal connected to the changeover terminal.

10. The power module of claim 9, wherein the power module is provided in an inverter configured to control driving of the motor according to a motor driving mode, and the motor driving mode comprises:
    a closed-end winding mode in which the changeover switch is turned on such that the neutral point is formed; and
    an open-end winding mode in which the changeover switch is turned off such that the neutral point is not formed.

11. The power module of claim 1, wherein the changeover switch has a current output terminal configured to form the common node with a current input terminal of the top switch, and connected to the changeover terminal, and the changeover switch has a current input terminal connected to the positive terminal.

12. The power module of claim 11, wherein the power module is provided in an inverter configured to control driving of the motor according to a motor driving mode, and
the motor driving mode comprises:
a closed-end winding mode in which the top switch is turned on such that the neutral point is formed, and in which the bottom switch and the changeover switch are turned off; and
an open-end winding mode in which the changeover switch is turned off such that the neutral point is not formed.

13. The power module of claim 1, wherein the changeover switch has a current input terminal configured to form the common node with a current output terminal of the bottom switch, and connected to the changeover terminal, and the changeover switch has a current output terminal connected to the negative terminal.

14. The power module of claim 13, wherein the power module is provided in an inverter configured to control driving of the motor according to a motor driving mode, and
the motor driving mode comprises:
a closed-end winding mode in which the bottom switch is turned on such that the neutral point is formed, and in which the top switch and the changeover switch are turned off; and
an open-end winding mode in which the changeover switch is turned on such that the neutral point is not formed.

\* \* \* \* \*